Nov. 18, 1958  C. C. BUCKNER  2,860,581
FLUID PUMPS

Filed Sept. 23, 1954  3 Sheets-Sheet 1

FIG.I.

INVENTOR.
CECIL C. BUCKNER
BY
ATTORNEYS

Nov. 18, 1958  C. C. BUCKNER  2,860,581
FLUID PUMPS
Filed Sept. 23, 1954  3 Sheets-Sheet 3

INVENTOR.
CECIL C. BUCKNER
BY
ATTORNEYS

United States Patent Office 2,860,581
Patented Nov. 18, 1958

2,860,581

FLUID PUMPS

Cecil C. Buckner, Detroit, Mich.

Application September 23, 1954, Serial No. 457,860

2 Claims. (Cl. 103—162)

The present invention relates to fluid pumps of the wobble plate type.

Pumps of this type are usually of variable delivery under substantially constant pressure, the delivery varying from zero to the maximum capacity of the pump.

In certain uses of such a pump, it is highly desirable to be able to control the amount of fluid delivered in order to control the effect of the fluid on the mechanism operated thereby.

It is therefore among the objects of the present invention to provide means for controlling such delivery.

Another object is to provide means for limiting the delivery at any one or a plurality of points in the possible range of capacity of the pump whereby to provide different speeds of operation for the mechanisms being actuated by the fluid being delivered under pressure.

Still other objects will readily occur to those skilled in the art upon reference to the following description and drawings in which Fig. 1 is a longitudinal central sectional view on line 1—1 of Fig. 2.

Figure 3:
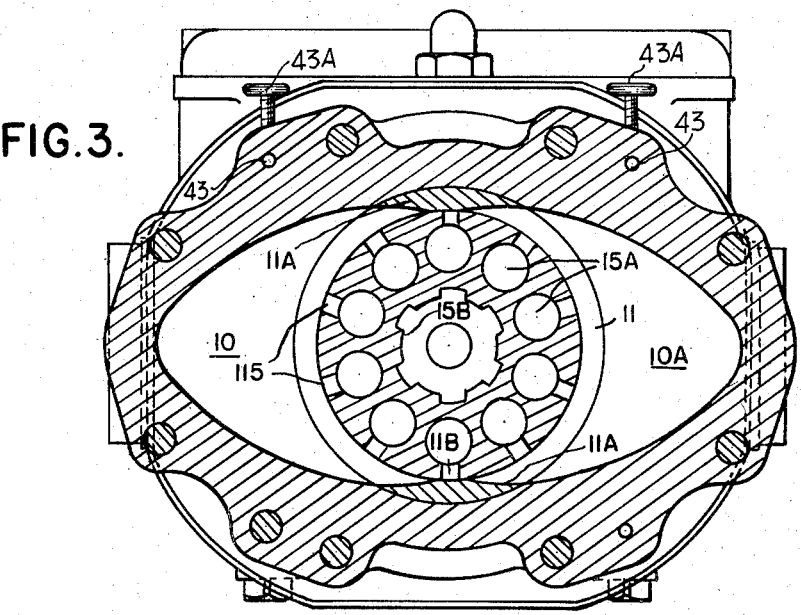
Fig. 3 is a section on line 3—3 of Fig. 2.

In the drawings, a pump involving the invention is shown as comprising a housing consisting for convenience in assembly, of three parts, A, B and C fixed together by suitable screws or bolts some of which are shown in section in Fig. 3.

Figure 1:
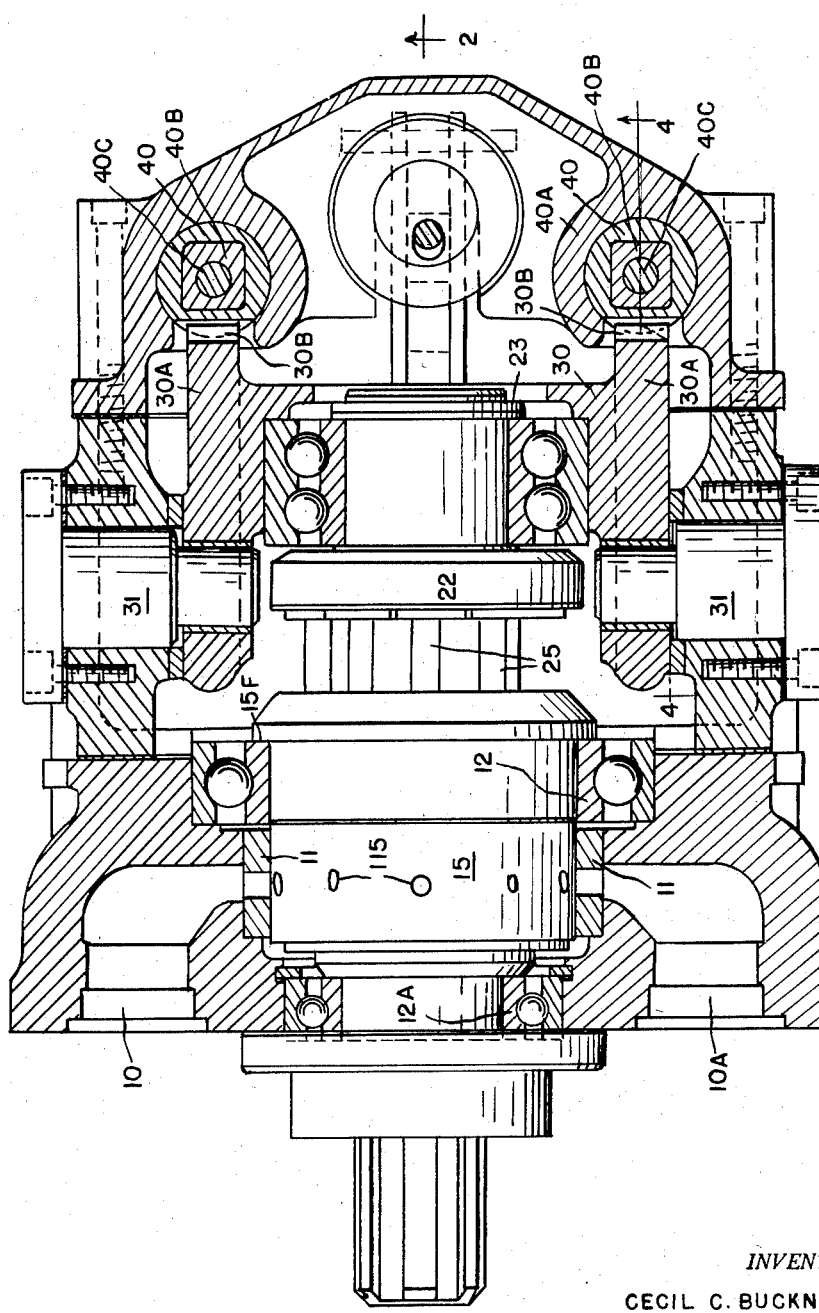

In Fig. 1, the portion A is shown as including the inlet and outlet passages and enclosed chambers 10 and 10A, either being an "inlet" or "outlet" according to the direction of rotation of the cylinder block 18, and these are separated from each other by the cylinder block 15 and the portions 11A of a ring 11 (see Fig. 3). The ring 11 as shown consists of a ring of rectangular section of which the central portion is cut away at diametrically opposite sides to leave only the diametrically oppositely located portions 11A which include a short arcuate surface 11B adapted to bear against the outer wall of the cylinder block and therewith complete the separation between chambers 10 and 10A and also act as a valve for the fluid passages 115 arranged radially of the block 15 and opening to the cylinders 15A.

Figure 2:
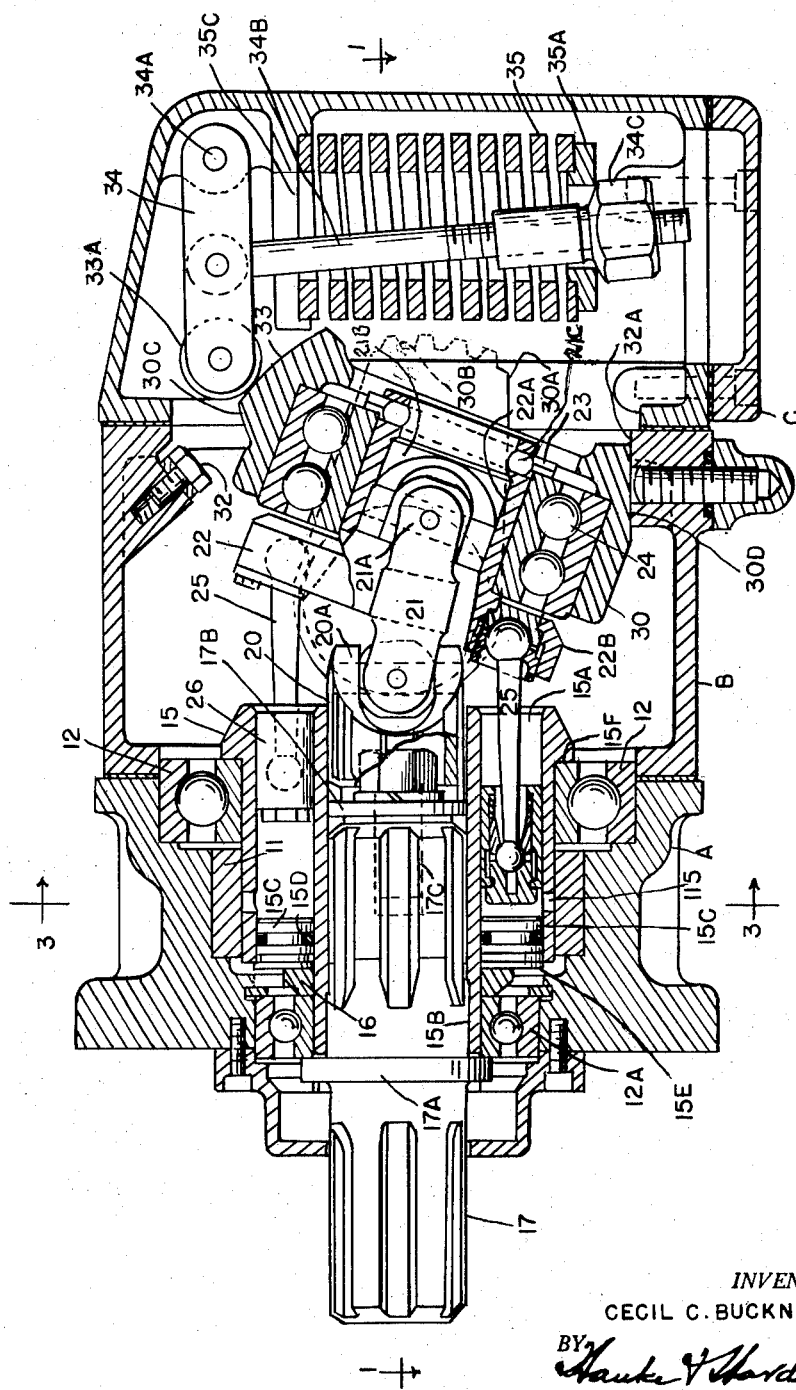
Fig. 2 is a similar view on line 2—2 of Fig. 1.

As shown in Figs. 1 and 2, the cylinder block 15 is rotatably mounted in the ring 11 and suitable antifriction bearings 12 and 12A and consists of a cylindrical block having a plurality of cylinders 15A extending axially and evenly spaced around a central axial opening 15B. As shown in Fig. 2, the cylinders 15A are open at both ends, the block being cut away at the lower end leaving the wall of opening 15B extending beyond the lower ends of the cylinders and mounted in the bearing 12A.

The lower ends of cylinders 15A are closed by the plugs 15C provided with gaskets 15D and with a small head 15E between which and the bearing 12A lies a spacer ring 16. The upper end of the block 15 is provided with a flange 15F lying against the bearing 12 to prevent longitudinal movement outwardly of the block.

Splined in the central opening 15B of the block is a stub drive shaft 17 having a shoulder 17A extending outwardly so as to contact the inner race of bearing 12A. The inner end of shaft 17 extends well into but not through the block 15 and the internal splines in the latter are interrupted a short distance beyond the end of the shaft to form abutments against which may rest a washer 17B which together with a screw 17C, entering the end of the shaft serves to hold the shaft in position in the block.

Into the inner end of opening 15B of the cylinder block is also splined a short shaft section 20 axially bored to receive the head of screw 17C and cut away to provide a yoke 20A which forms an element of a universal joint construction. At its other end, the link 21 is connected through a second universal joint 21A to a cylindrical block 21B fixed within the central opening 22A of a piston rod carrier 22 by means of a suitable pin 21C. The part of the carrier 22 containing the opening 22A which may be called the "body" is cylindrical and provided with a groove near its end to receive spring rings 23 serving to fix it in the inner race of bearing 24.

At the other end of the body the carrier 22 is provided with a large flange portion 22B in which are mounted the ends of piston rods 25 which connect with pistons 26 operating in the cylinders 15A. Each of the rods 25 is provided at both ends with spherical knobs cooperating with suitable sockets in the pistons and carrier to provide universal joints.

The bearing 24 within which the carrier 22 rotates is fixed in a suitable opening in a block 30 which in turn is mounted upon trunnions 31 carried in the part B of the housing, so that the block may be swung through a short arc. Further the block 30 is provided with arms 30A terminating in short gear segments 30B and with accurately located flat faces 30C and 30D adapted to contact suitable stops 32 and 32A, respectively, to limit the rocking movement of block 30. Both stops 32 and 32A are preferably adjustable, the stop 32 consisting preferably of a screw entering a lug within the housing so that this particular adjustment is not available after complete assembly. Stop 32A may be adjusted from the outside of the pump.

The block 30 is also provided with an arcuate surface at 33 adjacent the stop face 30C, which surface 33 is adapted to cooperate with a roller 33A carried at the end of a lever 34 pivoted in the housing portion C at 34A. Intermediate the length of lever 34 is pivotally attached a link 34B extending downwardly through a helical spring 35 and abutment plate 35A and threaded into a suitable nut 34C. The upper end of the spring 35 abuts a suitable stop 35C formed as a part of the housing member C. By means of the nut 34C the tension of the spring 35 may be adjusted to produce the desired downward pull on lever 34.

The gear segments 30A extend into the housing member C and coact with short cylindrical rack members 40 (see Fig. 4) slidable in vertically arranged guides 40A and having axial square bores to receive traveling nuts 40B threaded on shafts 40C, these extending to the outside of the housing and provided with polygonal ends 40D for the application of a suitable wrench. This end of the guide 40A is closed by means of a screw plug 40E axially bored and threaded to receive the axially bored retaining plug 40F through which passes the extending end of shaft 40C. The shaft is provided with a suitable shoulder 40H to prevent longitudinal movement. Slidable in the upper ends of the guides 40A which form cylinders 45 therefor are pistons 41, these having axial cavities 41A to permit their receiving the ends of shafts 40C when moved downwardly.

The upper ends of the cylinders 45 above pistons 41 are closed by suitable plugs 42 over which lie protective caps 42A and into the cylinders 45 above the pistons open fluid conduits 43, controllable by suitable valves 43A. These conduits lead to the cylinders 45 from the delivery of the pump.

In the operation of the pump, rotation of the cylinder block 15, by means of the shaft 17, simultaneously rotates the carrier 22 in the pivotally mounted block 30 and as long as the latter is at an angle to the axis of the cylinder block 15, pumping will be continued.

With free flow from the delivery, block 30 will remain at its maximum angularity, but when the delivery is opposed to develop pressure, back pressure upon pistons 26 tends to swing the block 30 to a position coaxial with the cylinder block 15. This tendency to swing is resisted by the action of the surface 33 moving to lift lever 34 against the pressure of spring 35. The delivery pressure may therefore be controlled by the adjustment of the tension of spring 35.

As the block 30 swings on the trunnions 31, the gear segments 30B will move the racks 40 up and down on the nuts 40B and their travel may be the distance between the pistons 41 and the bottom of the guide 40A. If, however, it is desired to limit the delivery of the pump, fluid under pressure is let into the cylinder 45 above the piston 41 to force the latter, and with it the rack 40, downwardly until the piston abuts the nut 40B, the position of which may be regulated by the rotation of shaft 40C. This action causes the arm 30A to be also moved downwardly and thereby cause less than maximum delivery. However, if back pressure on the pumping pistons rises, the arms 30A may move further downwardly.

Figure 4:
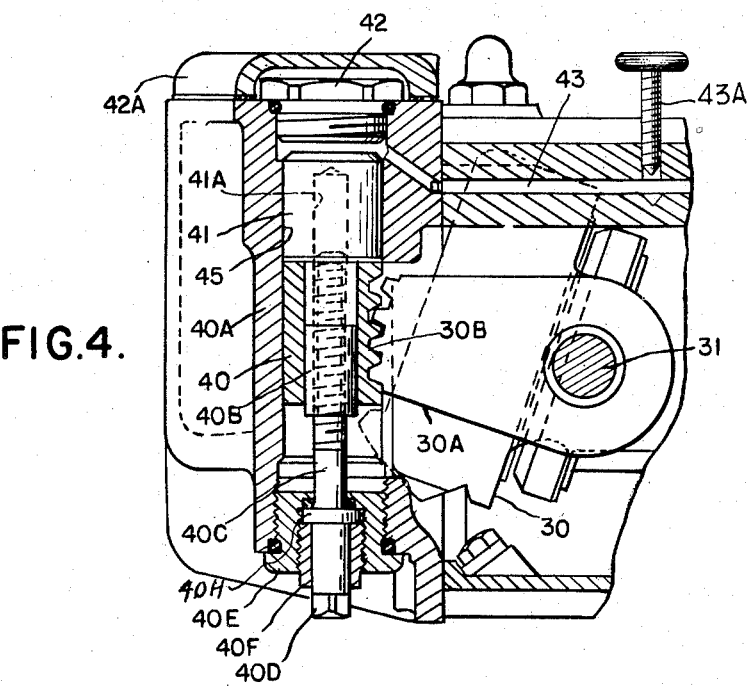
Fig. 4 is a section on line 4—4 of Fig. 1.

In the drawings, the control means shown in Fig. 4 is indicated as being in duplicate and it is intended that these may be operated simultaneously, and to a like degree. They, however, may be actuated separately and to a different degree. It is even contemplated that more than two of such controls may be desirable so as to provide several adjustments of the delivery.

I claim:

1. In a fluid pump of the type having a rotatable cylinder block provided with axially extending pumping cylinders and a rotatable piston carrier tiltable to vary the stroke of the pistons in said cylinders from a position of maximum stroke to position of minimum stroke, means for controlling the delivery of the pump consisting of a pair of arms fixed to said carrier, slidable members movable by said arms, guides for said members each terminating at one end in a cylinder, a stop piston in each of said terminal cylinders adapted to act as stops for said slidable members, hydraulic means for moving said stop pistons whereby to vary the extent of the movement of the said slidable members, and means for separately controlling the hydraulic means for said stop pistons.

2. In a fluid pump of the type having a rotatable cylinder block provided with axially extending pumping cylinders and a rotatable piston carrier tiltable to vary the stroke of the pistons in said cylinders from a position of maximum stroke to position of minimum stroke, means for controlling the delivery of the pump consisting of a plurality of arms fixed to said carrier, a slidable member movable by each of said arms, a guide for each of said slidable members terminating at one end in a cylinder, a stop piston in each of said terminal cylinders adapted to act as a stop for the slidable member therein, hydraulic means for moving said stop pistons whereby to vary the extent of the movement of said slidable members in one direction, means for predetermining the movement of said stop pistons, and means for separately controlling the effect of said hydraulic means on the several stop pistons.

References Cited in the file of this patent

UNITED STATES PATENTS

| | | |
|---|---|---|
| 2,303,955 | Rose | Dec. 1, 1942 |
| 2,333,422 | Higgins | Nov. 2, 1943 |
| 2,456,109 | Buckner | Dec. 14, 1948 |
| 2,753,803 | Lawrence | July 10, 1956 |